United States Patent [19]

Shugina

[11] Patent Number: 5,738,789
[45] Date of Patent: Apr. 14, 1998

[54] METHOD OF PURIFICATION OF POLLUTED UNDERGROUND WATER

[76] Inventor: Galina Alexandrovna Shugina, Leninsky Prospect, d.70/11, kv. 436, Moscow, Russian Federation

[21] Appl. No.: 799,994

[22] Filed: Feb. 13, 1997

[30] Foreign Application Priority Data

Jan. 22, 1997 [RU] Russian Federation ............ 97100483

[51] Int. Cl.$^6$ ...................................................... C02F 3/34
[52] U.S. Cl. ............................ 210/610; 210/614; 210/747
[58] Field of Search ...................... 210/610, 611, 210/614, 631, 739–747, 170

[56] References Cited

U.S. PATENT DOCUMENTS

| | | | |
|---|---|---|---|
| 5,006,250 | 4/1991 | Roberts et al. | 210/610 |
| 5,302,287 | 4/1994 | Losack | 210/631 |
| 5,384,048 | 1/1995 | Hazen et al. | 210/610 |
| 5,393,426 | 2/1995 | Raskin et al. | 210/747 |
| 5,449,460 | 9/1995 | Buisman | 210/614 |

FOREIGN PATENT DOCUMENTS 1838598  8/1993  U.S.S.R. .

*Primary Examiner*—Thomas G. Wyse
*Attorney, Agent, or Firm*—Ladas & Parry

[57] ABSTRACT

A method of purifying underground water in a pollution zone comprises determining the rock components of the pollution zone and the flow velocity of the underground water; taking samples of the underground water from a plurality of wells without admitting air and determining their sulfate ion ($SO_4^{2-}$) concentration and pH value to reveal the acidity/alkalinity of the environment, a pH less then 4 or greater than 11 being changed to one in a range of values from about 4 to about 11. Then, sulfate-reducing bacteria are selected and a biomass of them is accumulated. The resulting biomass is introduced into the underground water through those wells whose water samples have a pH value lying within the range of values from about 4 to about 11. And then, the biomass is introduced into the underground water through the remaining wells. The biomass input depends on the sulfate ion concentration, the higher the sulfate ion ($SO_4^{2-}$) concentration, the higher the input of the indicated biomass, and the frequency at which the biomass is introduced depends on the flow velocity of the underground water, the higher the flow velocity of the underground water, the more frequently the above-mentioned biomass is introduced. As a result of introducing the biomass, the sulfate ion concentration falls to a value which is correspondingly up to/below its maximum permissible concentration.

3 Claims, No Drawings

METHOD OF PURIFICATION OF POLLUTED UNDERGROUND WATER

BACKGROUND OF THE INVENTION

The invention relates to the field of biological remediation of underground water pollution from mining, hydrometallurgical, machine building paper and pulp, chemical, oil refining, and nuclear industries, and from public utilities, more precisely it relates to a method of purifying polluted underground water.

This invention can be used most successfully in purifying underground water which has been polluted with sulfates, nitrates, heavy metals, for example Cu, Cr, V, Pb, Hg, etc., natural radionuclides, for example U, Th, La, etc., organic compounds, such as petroleum products, formaldehyde, etc.

SUMMARY OF THE INVENTION

Preserving the purity of surface and underground water basins is one of the most important tasks in the era of scientific and technical progress. At present the majority of active production processes have solid, liquid, or gaseous waste, which, by polluting the surface soil, enter underground waters and have a negative effect on the vital activity of humans and the ecological conditions of the environment. Fighting pollution which has already gotten into underground waters is a very complex task and requires expensive measures which are frequently difficult to implement.

One of the possible ways of solving this problem is the use of biotechnology, which is based on the use of living microorganisms. At present, biotechnology is considered a promising and ecologically clean production process. Microorganisms occupy a special place in nature. They are characterized by enormous resistance to unfavorable conditions in the environment and possess the capability of adapting to changing conditions of a medium.

There is a known method of purifying underground water in a zone of pollution from wastes, for example a zone of underground leaching, which uses a system of wells (see Russian patent no. 1838598).

This method is implemented as follows.

First, a sample of underground water is taken from a number of wells located in the pollution zone. Then, the sulfate ion ($SO_4^{2-}$) concentration is determined in each sample and the resulting sulfate ion ($SO_4^{2-}$) concentration values are compared with their maximum permissible values to determine the degree of pollution of the underground water by sulfate ions ($SO_4^{2-}$). A biomass of sulfate-reducing bacteria isolated from one of the mineral deposits is grown in the presence of a nutrient medium comprising mineral and organic components, and then the biomass with the insoluble solid part of the organic component of the nutrient medium is introduced through the wells into the polluted underground water. After a period of adaptation of the sulfate-reducing bacteria to the given conditions of the medium, they reduce sulfate ions ($SO_4^{2-}$) to hydrogen sulfide ($H_2S$), which binds the metallic elements iron (Fe), copper (Cu), lead (Pb), zinc (Zn), mercury (Hg), nickel (Ni), cobalt (Co), cadmium (Cd), etc., into an insoluble sulfide or disulfide form and reduces the oxygen content in the underground water, which changes such elements as selenium (Se), uranium (U), molybdenum (Mo), rhenium (Re), and vanadium (V) to the insoluble mineral phase; in the process, nitrates ($NO_3^-$) are capable of being reduced to molecular nitrogen ($N_2$), and an alkalization of the environment also occurs according to the reaction $$SO_4^{2-} + 6H_2O + 8\ e^- \rightarrow H_2S + 10\ OH^-$$

which is accompanied by the precipitation of elements which are hydrolizates of aluminum (Al), chromium (Cr), beryllium (Be), manganese (Mn), etc.

Thus, the concentration of sulfate ions is lowered to a value close to its maximum permissible concentration. However, the known method has a reduced degree of purification due to loss of biomass of the sulfate-reducing bacteria, since part of the bacteria dies due to the new conditions of the underground environment which it has to adapt to. Moreover, implementing the above-described method can lead to fouling the wells with the solid part of the organic component of the nutrient medium.

BRIEF DESCRIPTION OF THE INVENTION

With this invention, the invention was attempted to increase the degree of purification of underground water in a pollution zone, i.e., to obtain values of the sulfate ion concentration up to/below the maximum permissible concentration.

One other goal of this invention is to shorten the time it takes for the underground water to attain a sulfate ion concentration which is correspondingly up to/below the maximum permissible concentration.

Another attempt of this invention is reducing the expenses for the purification process.

The essence of the invention is that the method in accordance with the invention for purifying underground water in a pollution zone comprises the following operations:

determining the rock components of the pollution zone, from rubbly-gravely-pebbly to sandy-loamy-gravely;

determining the speed of the current of underground water in the above-mentioned pollution zone, which depends on the above-mentioned rock components;

taking a sample of underground water without admitting air from each well of a number of wells located in the pollution zone;

determining the sulfate ion ($SO_4^{2-}$) concentration in the above-mentioned sample;

comparing the value of the sulfate ion ($SO_4^{2-}$) concentration with its maximum permissible value to determine the degree of pollution of the underground water by sulfate ions ($SO_4^{2-}$);

determining the pH value in the above-mentioned sample to reveal the acidity/alkalinity of the underground water, a pH value less than 4 or more than 11 being changed to one in a range of values from about 4 to about 11;

introducing into the indicated sample, which has a pH corresponding to a value lying in the range from about 4 to about 11, a nutrient medium for isolating sulfate-reducing bacteria, comprising mineral and organic components;

growing the indicated isolated sulfate-reducing bacteria, which produces a biomass of sulfate-reducing bacteria;

introducing the above-mentioned biomass into the underground water through those wells of the above-mentioned number of wells whose above-mentioned water samples have a pH value lying in the range of values from about 4 to about 11, and then introducing the above-mentioned biomass into the underground water through the remaining above-mentioned number of wells, the input of the mentioned biomass depending on the sulfate ion ($SO_4^{2-}$) concentration, the higher the sulfate ion ($SO_4^{2-}$) concentration, the higher the input of the indicated biomass, and the frequency of introduction of the indicated biomass depending on the speed of the current of the underground water, the higher the speed of the current of the underground water, the more frequently the mentioned biomass is introduced, as a result of introducing the indicated biomass the sulfate ion concentration falls to a value which is correspondingly up to/below the maximum permissible concentration.

Such an implementation of the method ensures an increase in the degree of purification of the underground water in the pollution zone.

This is a result of the fact that the period of adaptation of the sulfate-reducing bacteria is excluded, and favorable conditions are created for their vital activity by putting the sulfate-reducing bacteria into the underground water through wells having a pH value lying in the range from about 4 to about 11.0.

Taking into consideration the rock components of the pollution zone and the speed of the underground flow through them increases the intensity of adhesion of the sulfate-reducing bacteria, which increases the degree of purification of the underground water in the pollution zone.

Taking into consideration the speed of the current of the polluted underground water creates a biological barrier of sulfate-reducing bacteria, which prevents the spread of the polluted underground water.

Shortening the time it takes for the underground water to attain a sulfate ion concentration which is correspondingly up to/below the maximum permissible concentration is explained by the fact that the biomass is initially introduced into those wells of the number of wells whose sample has a pH in the range of values from about 4 to about 11, and the metabolic product of the sulfate-reducing bacteria— hydrogen sulfide ($H_2S$)—is spread by the current the of underground water. This reduces the water's dissolved oxygen content and its acidity, which creates more favorable conditions for the vital activity of the sulfate-reducing bacteria in the region of the wells whose samples had a pH less than 4. Creating improved conditions for the vital activity of sulfate-reducing bacteria in a large volume of underground water in the pollution zone increases the degree of purification and reduces the time it takes.

As the organic component of the nutrient medium, it is advisable to use a series formed by an aqueous solution of clay having a solid-to-liquid ratio of about 0.001 to about 0.003, an aqueous solution of natural carbohydrate polymers with a solid-to-liquid ratio from about 0.001 to about 0.005, or a mixture of these.

As the natural carbohydrate polymers, the use of a series formed from vegetable remnants, sawdust, reed, sedge, and household refuse is recommended.

The expediency of selecting an aqueous solution of clay having the above-mentioned solid-to-liquid ratio as the organic component of the nutrient medium is dictated by the fact that it contains organic inclusions, for example remnants of the vegetable or animal kingdom. And, also because clay also contains various mineral inclusions, for example mica, carbonates, etc., which can be used by sulfate-reducing bacteria as a nutrient medium.

Given a solid-to-liquid ratio of 0.001 in the aqueous solution of clay, the reduction of sulfate ions ($SO_4^{2-}$) by sulfate-reducing bacteria can slow down or can stop. Given a solid-to-liquid ratio of 0.003 in the aqueous solution of clay, the biomass of the sulfate-reducing bacteria does not increase, which is economically inexpedient.

The expediency of selecting an aqueous solution of natural carbohydrate polymers having the above-mentioned solid-to-liquid ratio as the organic component of the nutrient medium is dictated by the fact that they contain water-soluble organic compounds which are a source of nutrients for sulfate-reducing bacteria.

Given a solid-to-liquid ratio of 0.001 in the aqueous solution of natural carbohydrate polymers, the reduction of sulfate ions ($SO_4^{2-}$) by sulfate-reducing bacteria can slow down or can stop.

Given a solid-to-liquid ratio of 0.005 in the aqueous solution of natural carbohydrate polymers, the biomass of the sulfate-reducing bacteria does not increase, which is economically inexpedient.

The expediency of selecting a mixture of aqueous solutions of clay and natural carbohydrate polymers as the organic component of the nutrient medium is due to the fact that they offer a variety of organic compounds, which has a favorable effect on the growth of the biomass of sulfate-reducing bacteria.

The expediency of selecting vegetable remnants, sawdust, reed, sedge, and household refuse as the natural carbohydrate polymers is dictated by the fact that they are a cheap and readily available raw material.

Other attempts and advantages of the invention will become more understandable from the following concrete description of the method in accordance with the invention for purifying underground waters in a pollution zone, and from the example.

DETAILED DESCRIPTION OF THE INVENTION PREFERABLE IMPLEMENTATIONS

The method in accordance with the invention for purifying underground water in a zone of pollution, for example, from a concentrating mill for processing copper ores, comprises the following operations.

On the basis of data from the concentrating mill, an evaluation is made of the rock components of the pollution zone, which can range from rubbly-gravely-pebbly to sandy-loamy-gravely. Then the speed of the current of the underground water in the pollution zone is determined, which can vary in a range of values from 2 m/day to 0.1 m/day, depending on the above-mentioned rock components. To determine the indicated speed of underground flow, a number of wells are used which are located in the pollution zone, that is, on the territory of the concentrating mill. After that, a sample of underground water is taken from the number of above-mentioned wells without admitting air, for example by means of a subsurface sampler. This is because air has a destructive effect on anaerobic sulfate-reducing bacteria. After that the sulfate ion ($SO_4^{2-}$) concentration is determined in each sample. Each of the resulting values of the sulfate ion ($SO_4^{2-}$) concentration is compared with its maximum permissible value to determine the degree of pollution of the underground water by sulfate ions ($SO_4^{2-}$). After that the pH value in each sample is determined to reveal the acidity/alkalinity of the underground water. If the pH value is less than 4 or more than 11, its value is changed to one in a range of values from about 4 to about 11, i.e., the acidity or alkalinity of the sample of underground water is reduced. Then, a nutrient medium is introduced into each sample of underground water having a pH corresponding to a value lying in the range from about 4 to about 11, in order to isolate sulfate-reducing bacteria. As the nutrient medium, the well-known Postgate medium can be used (Postgate 1966), in which the component includes the following compounds: ($KH_2PO_4$); ($NH_4Cl$); $Na_2SO_4$; $CaCl_2 \cdot 6H_2O$;

$MgSO_4 \cdot 7H_2O$; $FeSO_4 \cdot 7H_2O$; and the organic component includes: sodium lactate, yeast extract, and sodium citrate. In addition, the Starky medium (Starky, 1938), the Baars medium (Baars, 1930), etc., can be used as the nutrient medium.

After sulfate-reducing bacteria are isolated, they are grown, which produces a biomass of the indicated bacteria.

The resulting biomass is introduced into the underground water through those wells whose water sample had a pH value within the range of values from about 4 to about 11, in order to provide the best possible conditions for the vital activity of the sulfate-reducing bacteria. The input of biomass depends on the concentration of sulfate ions ($SO_4^{2-}$), in particular, the higher the sulfate ion ($SO_4^{2-}$) concentration, the higher the input of biomass. It has been found experimentally that with a sulfate ion ($SO_4^{2-}$) concentration of 2–3 g/l, the input of biomass of sulfate-reducing bacteria is 0.5–0.8% of the volume of polluted water; with a sulfate ion ($SO_4^{2-}$) concentration of 4–6 g/l the input of the specified biomass is 0.8–1.0% of the volume of polluted water; with a sulfate ion ($SO_4^{2-}$) concentration of 7–9 g/l the input of the above-mentioned biomass is 1.0–1.5% of the volume of polluted water; with a sulfate ion ($SO_4^{2-}$) concentration of 10–15 g/l the input of the indicated biomass is 1.5–2.0% of the volume of polluted water.

The metabolic product of the sulfate-reducing bacteria, hydrogen sulfide ($H_2S$), is distributed by the current of the underground water. This lowers the water's dissolved oxygen content and its acidity, which creates more favorable conditions for the vital activity of sulfate-reducing bacteria in the region of the wells whose underground water had a pH less than 4.

After a certain amount of time has passed, for example not less than 20 days, the biomass is introduced into the underground water through the remaining wells.

Determining the sulfate ion ($SO_4^{2-}$) concentration in the underground water is done no earlier than 30 days after the biomass of sulfate-reducing bacteria was introduced into it. Samples of the underground water are collected according to the methodology described above. The sulfate ion ($SO_4^{2-}$) concentration is reduced by 20–30%.

The frequency of introducing the biomass of sulfate-reducing bacteria depends on the speed of the current of the underground water, in particular, the faster the speed of the current of the underground water, the more frequently the indicated biomass is introduced.

As a result of introducing the biomass of sulfate-reducing bacteria, the sulfate ion ($SO_4^{2-}$) concentration falls to a value which is correspondingly up to/below its maximum permissible concentration. Repeated introduction of a biomass of sulfate-reducing bacteria accelerates the process of purifying the underground water in the pollution zone.

Reducing sulfate ions ($SO_4^{2-}$) by sulfate-reducing bacteria to hydrogen sulfide ($H_2S$) causes the precipitation of alkaline-earth metals, for example calcium (Ca), magnesium (Mg), etc., with the formation of insoluble carbonates and an increase in the alkalinity of the underground water. Moreover, the hydrogen sulfide ($H_2S$) formed interacts with metallic elements and elements close to them, for example iron (Fe), copper (Cu), zinc (Zn), lead (Pb), mercury (Hg), nickel (Ni), cobalt (Co), cadmium (Cd), etc., which leads the latter to change into the insoluble sulfide/disulfide form. Moreover, such elements as selenium (Se), radionuclides, vanadium (V), etc., are reduced and change into the insoluble phase, and nitrates are reduced to molecular nitrogen. In addition to what is described above, the increase in alkalinity of the underground water is accompanied by the precipitation of hydrolyzate elements, for example aluminum (Al), beryllium (Be), chromium (Cr), manganese (Mn), etc.

The above-described method of purifying underground water in a pollution zone using a well-known nutrient medium leads to an increase in the total mineralization of the underground water, which is undesirable.

A further embodiment of the method in accordance with the invention prevents an increase in the mineralization of the underground water and decreases expenses for the purification process by using a nutrient medium whose organic component is formed by a series including an aqueous solution of clay having a solid-to-liquid ratio from about 0.001 to about 0.003, an aqueous solution of natural carbohydrate polymers having a solid-to-liquid ratio of about 0.001 to about 0.005, or a mixture of these. For the natural carbohydrate polymers a series which is formed from vegetable remnants, sawdust, reed, sedge, and household waste is used.

The method in accordance with the invention for purifying underground water in a pollution zone is performed in an analogous manner to that which is described above. The difference is in the composition of the nutrient medium which is used to isolate and grow the biomass of sulfate-reducing bacteria. The nutrient medium includes:

¥ a mineral component, containing: 0.1–0.5 g/l ammonium sulfate ($(NH_4)_2SO_4$) and 0.2 g/l dibasic potassium phosphate ($K_2HPO_4$) or monobasic potassium phosphate ($KH_2PO_4$);

¥ an organic component, for example, sawdust, which is a natural carbohydrate polymer.

The above simplified nutrient medium is favorable for the vital activity of sulfate-reducing bacteria and preserves the natural level of mineralization of underground water.

Thus, using only a single group of microorganisms — sulfate-reducing bacteria, which are a part of nature can purify underground water in a pollution zone of practically all polluting elements which change into an insoluble phase.

The table shows the results of the purification of underground water, in accordance with the invention, in the pollution zone of a concentrating mill for processing copper ores. Analysis of the resulting data indicates a high degree of purification of the underground water, caused by the combined action of the hydrogen sulfide reducing and neutralizing barriers which arise during the process of the vital activity of natural sulfate-reducing bacteria.

TABLE

| Element | Concentration (mg/l) | |
|---|---|---|
| | Before purification | After purification |
| $SO_4^{2-}$ | 2,000 | 50.0 |
| $NO_3^-$ | 300 | 0.00 |
| Fe | 0.28 | 0.07 |
| Al | 0.42 | 0.05 |
| Zn | 1.08 | 0.09 |
| Co | 0.8 | 0.04 |
| Ni | 0.7 | 0.02 |
| Cr | 0.025 | 0.002 |
| Cu | 0.04 | 0.002 |
| Sn | 0.8 | 0.04 |
| Sr | 4.8 | 0.8 |
| V | 0.050 | 0.001 |
| Pb | 0.40 | 0.05 |
| Sb | 0.92 | 0.06 |

I claim:

1. Method of purifying underground water in a pollution zone, comprising:

determining the rock components of the pollution zone, from rubbly-gravely-pebbly to sandy-loamy-gravely;

determining the flow velocity of the underground water in said pollution zone, which depends on said rock components;

taking a sample of the underground water from a plurality of wells located in the pollution zone without admitting air;

determining the sulfate ion ($SO_4^{2-}$) concentration in said sample;

comparing the resulting value of the sulfate ion ($SO_4^{2-}$) concentration with its maximum permissible value to determine the degree of pollution of the underground water by sulfate ions ($SO_4^{2-}$);

determining the pH value in said sample to reveal the acidity/alkalinity of the underground water, a pH value less than 4 or more than 11 being changed to one within a range of values from about 4 to about 11;

introducing into said sample, which has a pH corresponding to a value within the range from about 4 to about 11, a nutrient medium comprising mineral and organic components for selecting sulfate-reducing bacteria;

accumulating said selected sulfate-reducing bacteria, which produces a biomass of sulfate-reducing bacteria;

introducing said biomass into the underground water through those said plurality of wells where said water samples have a pH value within the range of values from about 4 to about 11, and then introducing said biomass into the underground water through the remaining said plurality of wells, the input of said biomass depending on the sulfate ion ($SO_4^{2-}$) concentration, the higher sulfate ion ($SO_4^{2-}$) concentration, the higher the input of said biomass, and the frequency of introduction of said biomass depending on the flow velocity of the underground water, the higher the flow velocity of the underground water, the more frequently said biomass is introduced; as a result of the introduction of said biomass, the sulfate ion concentration falls to a value which is correspondingly up to/below the maximum permissible concentration.

2. The method of claim 1 wherein there is used as the organic component of the nutrient medium a series formed by an aqueous solution of clay having a solid-to-liquid ratio of about 0.001 to about 0.003; an aqueous solution of natural carbohydrate polymers with a solid-to-liquid ratio from about 0.001 to about 0.005, or a mixture of these.

3. The method of claim 2 wherein there is used as the natural carbohydrate polymers a series formed from vegetable remainders, wood sawdust, cane, sedge, and household waste.

* * * * *